United States Patent
Suzuki (10) Patent No.: US 10,444,997 B2
(45) Date of Patent: Oct. 15, 2019

(54) ELECTRONIC APPARATUS, NON-TRANSITORY COMPUTER-READABLE RECORDING MEDIUM AND HDD DISCONNECTING METHOD SUITED TO HDD FAILURE COUNTERMEASURES

(71) Applicant: KYOCERA Document Solutions Inc., Osaka (JP)

(72) Inventor: Masahiro Suzuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/719,316

(22) Filed: Sep. 28, 2017

(65) Prior Publication Data

US 2018/0088826 A1    Mar. 29, 2018

(30) Foreign Application Priority Data

Sep. 28, 2016 (JP) .................................. 2016-189982

(51) Int. Cl.
| | |
|---|---|
| G06F 12/00 | (2006.01) |
| G06F 3/06 | (2006.01) |
| G06F 11/20 | (2006.01) |
| G06F 11/16 | (2006.01) |

(52) U.S. Cl.
CPC .......... *G06F 3/0608* (2013.01); *G06F 3/0617* (2013.01); *G06F 3/0631* (2013.01); *G06F 3/0635* (2013.01); *G06F 3/0644* (2013.01); *G06F 3/0647* (2013.01);
(Continued)

(58) Field of Classification Search
CPC .... G06F 3/0608; G06F 3/0631; G06F 3/0685; G06F 3/0644; G06F 3/0635; G06F 3/0617; G06F 3/0647; G06F 3/0683; G06F 11/2094; G06F 11/1662
See application file for complete search history.

(56) References Cited

U.S. PATENT DOCUMENTS

| | | | |
|---|---|---|---|
| 6,535,998 B1* | 3/2003 | Cabrera | G06F 11/1415 714/15 |
| 9,465,643 B1* | 10/2016 | Andrews | G06F 9/45558 |
| 2007/0035769 A1* | 2/2007 | Takato | G03G 15/50 358/1.16 |

FOREIGN PATENT DOCUMENTS

| | | |
|---|---|---|
| JP | 2002-149500 A | 5/2002 |
| JP | 2016-051193 A | 4/2016 |
| JP | 2016-139252 A | 8/2016 |

OTHER PUBLICATIONS

Japan Patent Office. Office Action of foreign counterpart, dated Jun. 4, 2019.

* cited by examiner

*Primary Examiner* — Kalpit Parikh
(74) *Attorney, Agent, or Firm* — Hawaii Patent Services; Nathaniel K. Fedde; Kenton N. Fedde (57) ABSTRACT

Provided is an electronic apparatus for which an increase in cost due to an increase in the size of the electronic device and an increase in the number of parts is suppressed. A system-control unit manages each of the partitions of a HDD and a SSD (storage device) that has a smaller storage capacity than the HDD by a mounting process. When it becomes impossible to read data from or write data to any one of the partitions, the system-control unit moves data of the other partitions to the SSD (storage device). Moreover, the system-control unit, together with disconnecting the disabled partition, replaces the disabled partition with the partition to which the data is moved.

7 Claims, 8 Drawing Sheets

(52) U.S. Cl.
CPC .......... *G06F 3/0683* (2013.01); *G06F 3/0685* (2013.01); *G06F 11/2094* (2013.01); *G06F 11/1662* (2013.01)

ELECTRONIC APPARATUS, NON-TRANSITORY COMPUTER-READABLE RECORDING MEDIUM AND HDD DISCONNECTING METHOD SUITED TO HDD FAILURE COUNTERMEASURES

INCORPORATION BY REFERENCE

This application is based on and claims the benefit of priority from Japanese Patent Application No. 2016-189982 filed on Sep. 28, 2016, the contents of which are hereby incorporated by reference.

BACKGROUND

The present disclosure relates to an electronic apparatus, a non-transitory computer-readable recording medium and a HDD disconnecting method suited to HDD (Hard Disk Drive) failure countermeasures.

For example, an image forming apparatus is one kind of electronic apparatus. An image forming apparatus is a MFP (multifunction Peripheral) such as a multifunction printer, combination machine and the like. In an image forming apparatus, a large-capacity HDD (Hard Disk Drive) is mounted in order to achieve multi operations for various jobs such as copying, printing, a FAX (facsimile) and the like and user box functions.

Incidentally, a HDD may become inoperable due to change over the years, impact and the like. When a HDD becomes inoperable, it becomes impossible to read data from or write data to the HDD, and thus it becomes impossible to execute various jobs of the image forming apparatus.

As a method for eliminating such trouble, in typical technology, there is a hard disk apparatus that has plural HDDs, and gives a write command or read command to an HDD that is being operated, and according to the response time from that HDD, predicts the inoperability of that HDD in advance. Moreover, after copying the contents of that HDD that is being operated to another HDD before becoming inoperable, the hard disk apparatus disconnects the HDD that is being operated and starts operating the other HDD.

SUMMARY

The electronic apparatus according to an embodiment of the present disclosure includes a HDD, a storage device and a system-control unit. The HDD has plural partitions. The storage device has a smaller storage capacity than the HDD. The system-control unit manages each of the partitions of the HDD and the storage device by a mounting process. When it becomes impossible to read data from or write data to any one of the partitions, the system-control unit moves data of the other partitions to the storage device. Then, the system-control unit, together with disconnecting the disabled partition, replaces the disabled partition with the partition to which the data has been moved.

The non-transitory computer-readable recording medium according to an embodiment of the present disclosure stores an HDD disconnecting program that can be executed by a computer of an electronic apparatus. When the HDD disconnecting program is executed, the HDD disconnecting program causes the computer to manage each of the partitions of a HDD and a storage device that has a smaller storage capacity than the HDD by a mounting process. When it becomes impossible to read data from or write data to any one of the partitions, the program causes the computer to move data of the other partitions to the storage device. Then, together with causing the computer to disconnect the disabled partition, causes the computer to replace the disabled partition with the partition to which the data has been moved.

The HDD disconnecting method according to an embodiment of the present disclosure, includes: (i) managing each of the partitions of a HDD and a storage device that has a smaller storage capacity than the HDD by a mounting process; and (ii) when it becomes impossible to read data from or write data to any one of the partitions, together with moving data of the other partitions to the storage device and disconnecting the disabled partition, replacing the disabled partition with the partition to which the data has been moved.

DETAILED DESCRIPTION

In the following, an embodiment of an electronic apparatus according to the present disclosure will be explained with reference to FIG. 1 to FIG. 6. As an example of an electronic apparatus in the explanation below, there is a MFP Multifunction Peripheral) that is a combined peripheral machine that is mounted with a printing function, copying function, FAX function, data transmitting/receiving function via a network and the like.

Figure 1:
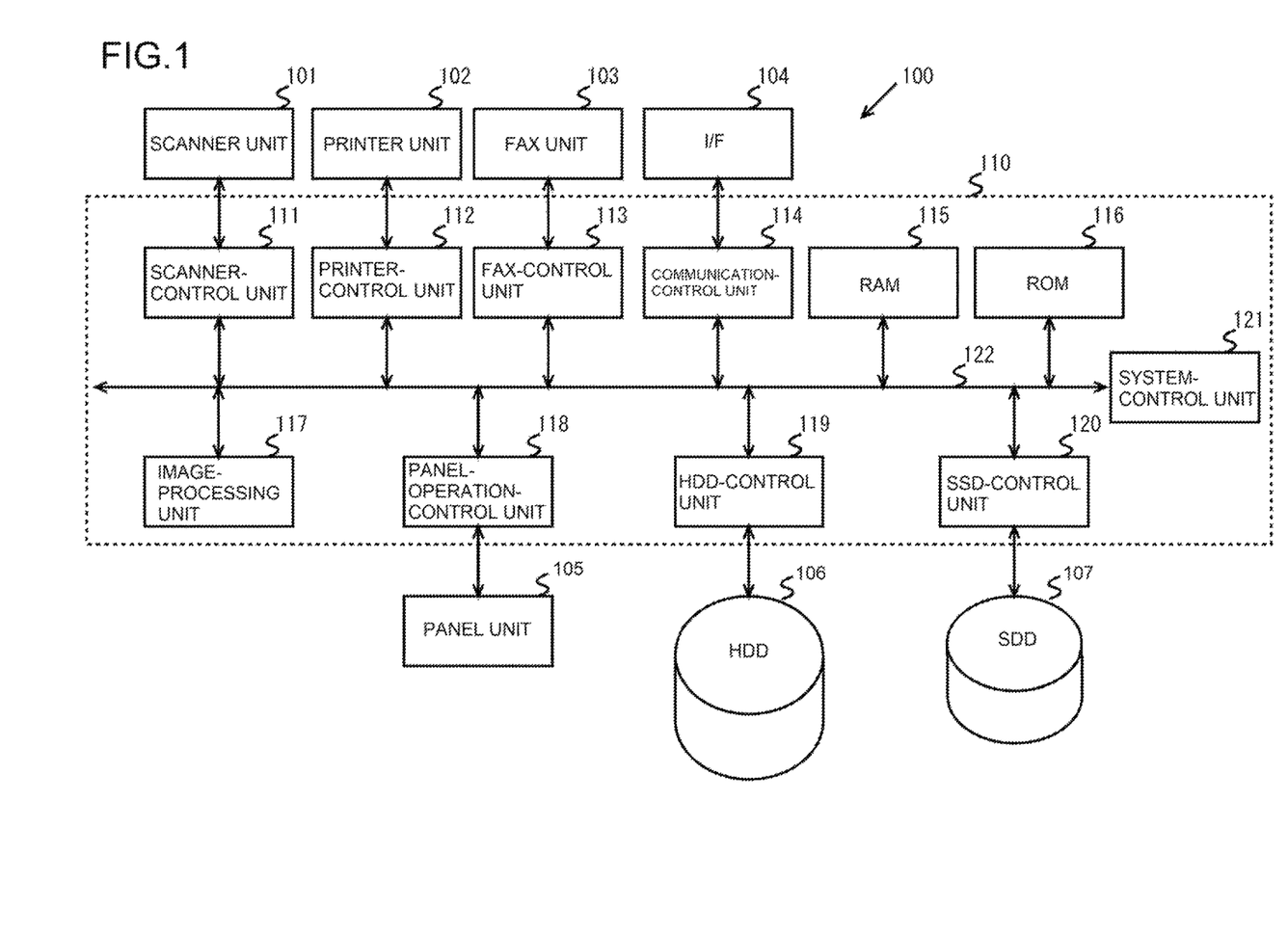
FIG. 1 illustrates an embodiment in which an electronic apparatus according to the present disclosure is applied to a MFP.

First, as illustrated in FIG. 1, the MFP 100 includes a scanner unit 101, a printer unit 102, a FAX unit 103, and I/F (interface) 104, a panel unit 105, a HDD (Hard Disk Drive) 106, a SSD (Solid State Drive) 107, and a control unit 110. There is only one HDD 106 mounted in the MFP 100. Moreover, the SSD 107 is a nonvolatile memory that uses a NAND type flash memory (registered trademark), and even though the access speed related to reading and writing data is faster than that of a HDD 106, the storage capacity is less.

The scanner unit 101 is a device that converts a document image that is read and obtained by an image sensor to a digital image, and inputs that digital image data to the control unit 110. The printer unit 102 is a device that prints an image on paper based on printing data that is outputted from the control unit 110. The FAX unit 103 is a device that transmits data that is outputted from the control unit 110 to the facsimile of another party over telephone lines, and receives data from the facsimile of another party and inputs that data to the control unit 110.

The I/F 104 is a device such as a network interface card that takes charge of communication with other user terminals, contents servers, web servers and the like via a network such an in-house LAN (Local Area Network), Internet and the like. The panel unit 105 is a device such as a touch panel that performs a display for the printing function, copying function, FAX function, data transmitting/receiving function via the Internet, and for various settings of the MFP 100. Moreover, the panel unit 105 displays errors that indicate whether or not there is failure of the HDD 106, for example.

The HDD 106, as will be described in detail later, is a storage device that stores application programs and the like for providing the various functions of the MFP 100. The SSD 107, as will be described in detail later, is a storage device that, similar to the HDD 106, is capable of storing application programs and the like for providing the various functions of the MFP 100. The SSD 107 has cell structure (hereafter, referred to as cells) that are the smallest units in which data can be written, and a controller that controls writing to the cells.

The control unit 110 is a processor that controls the overall operation of the MFP 100 by executing an image forming program, control program and the like. The control unit 110 includes a scanner-control unit 111, a printer-control unit 112, a FAX (Facsimile) control unit 113, a communication-control unit 114, RAM (Random Access Memory) 115, ROM (Read-Only Memory) 116, an image-processing unit 117, a panel-operation-control unit 118, a HDD-control unit 119, a SSD-control unit 120, and a system-control unit 121. Moreover, these are connected to a data bus 122.

The scanner-control unit 111 controls the reading operation of the scanner unit 101. The printer-control unit 112 controls the printing operation of the printer unit 102. The FAX-control unit 113 controls the data transmitting and receiving operation by the FAX unit 103. The communication-control unit 114, via the I/F 104, performs control of transmitting and receiving data and the like over a network.

The RAM 115 is a work memory for executing programs. The RAM 115 also stores printing data and the like for which image processing has been performed by the image-processing unit 117. The ROM 116 stores control programs for performing operation checks of each unit. The image-processing unit 117, performs, for example, image processing (rasterization) on image data that is read by the scanner unit 101. The panel-operation-control unit 118 controls the display operation of the panel unit 105. Moreover, the panel-operation-control unit 118, via the panel unit 105, receives the start of printing, copying, FAX, transmitting and receiving data via the Internet and the like. Furthermore, when failure of the HDD 106 occurs, for example, the panel-operation-control unit 118 causes the contents of the failure to be displayed.

The HDD-control unit 119 controls reading data from and writing data to the HDD 106. Moreover, when it becomes impossible to read data from or write data to the HDD 106, the HDD-control unit 119 notifies the system-control unit 121 that failure occurred in the HDD 106. The SSD-control unit 120 controls reading data from and writing data to the SSD 107. The system-control unit 121 control linked operation and the like of each of the units. When the system-control unit 121, as will be described in detail later, receives a notification from the HDD-control unit 119 indicating that failure occurred in the HDD 106, the system-control unit 121 executes processing to remount each of the partitions A to D (described later) of the HDD 106, and to disconnect the partitions A to D for which remounting failed.

Next, the configuration of the SSD 107 and the HDD 106 will be explained with reference to FIG. 2A and FIG. 2B. First, the SSD 107 illustrated in FIG. 2A stores system data for performing overall control of the MFP 100. Moreover, the SSD 107 has partitions a to d. The number of partitions a to d is arbitrary, however, in this embodiment, the case in which the number matches the number of partitions A to D of the HDD 106 (described later) is illustrated.

Figure 2A:
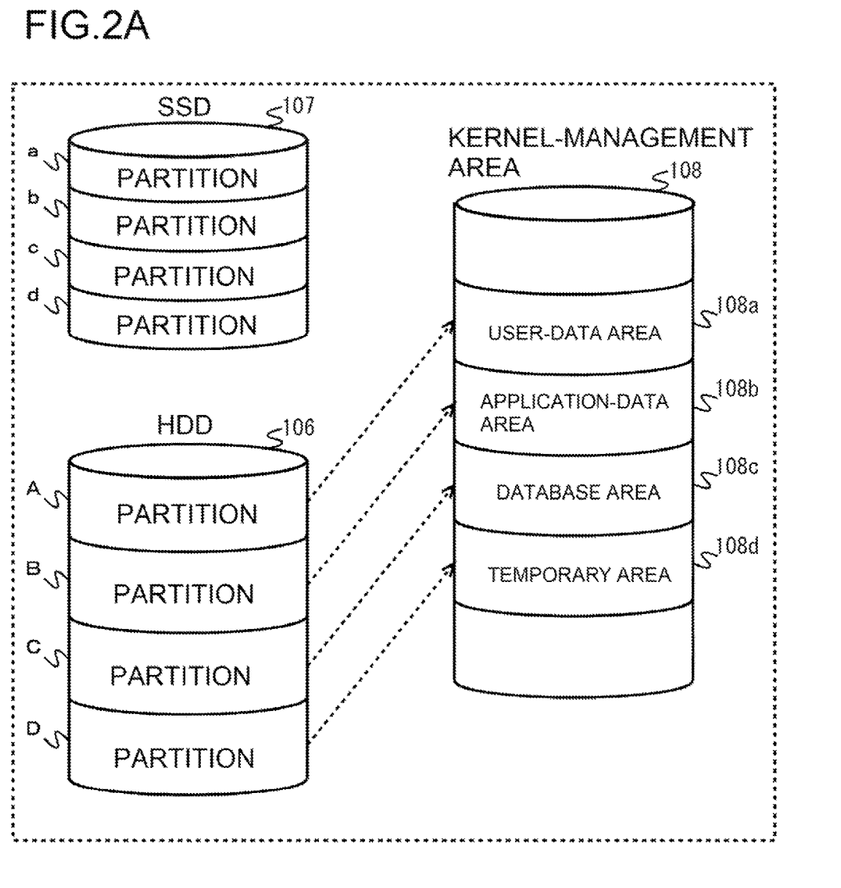
FIG. 2A explains the configuration of the SSD and HDD in FIG. 1, and illustrates the partitions of the SDD, the partitions of the HDD, and a kernel management area that manages the respective partitions.

Moreover, the HDD 106 illustrated in FIG. 2A has partitions A to D. Furthermore, the kernel-management area 108 illustrated in FIG. 2A is an area that is managed by the system-control unit 121, and illustrates an area where the partitions A to D of the HDD 106 are managed. In other words, the system-control unit 121 executes a mounting process for each of the partitions A to D, manages partition A as a user-data area 108a, manages partition B as an application-program (hereafter, referred to as an application) data area 108b, manages partition C as a database area 108c, and manages partition D as a temporary area 108d.

Figure 2B:
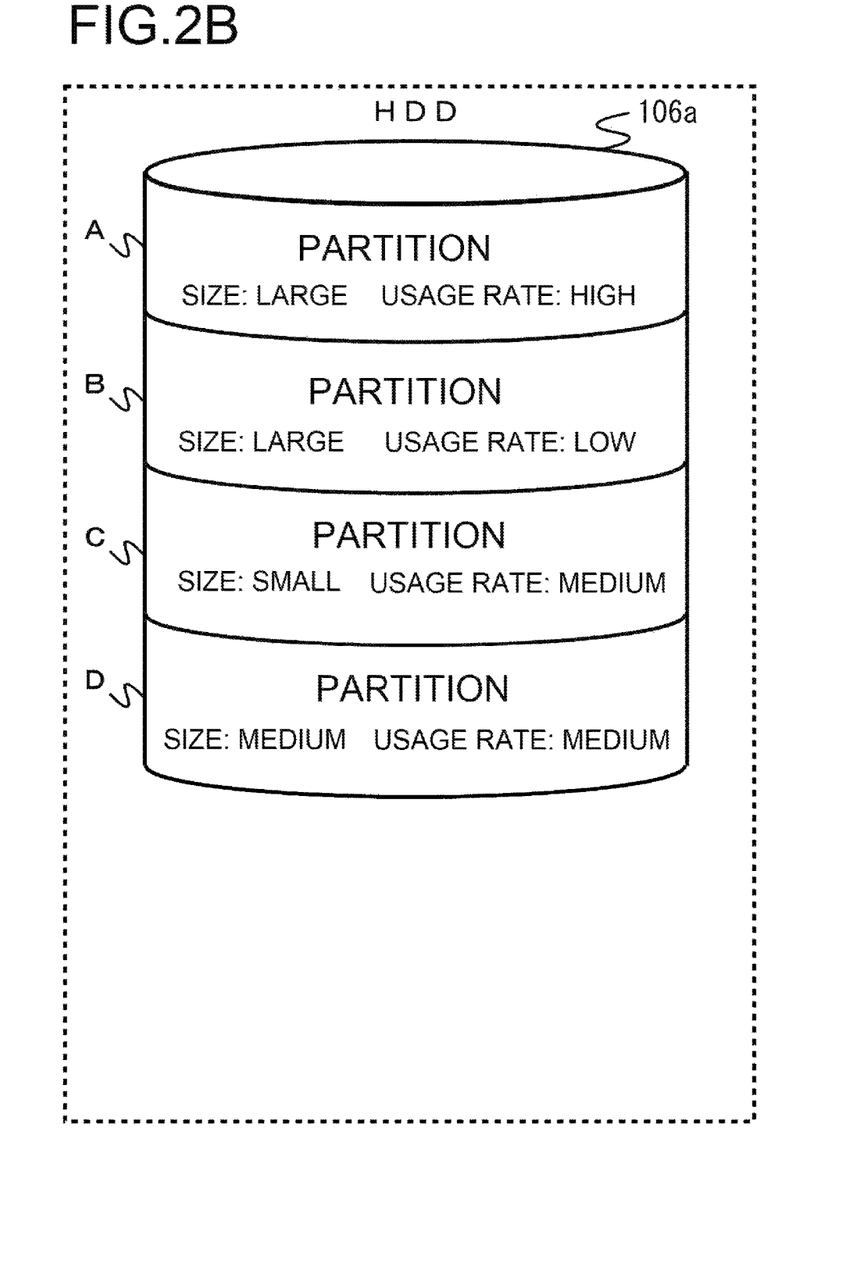
FIG. 2B explains the configuration of the SSD and HDD in FIG. 1, and illustrates an example of a HDD management area that manages the size and usage rate of each partition of the HDD.

FIG. 2B illustrates an example of a HDD-management area 106a where the size and usage rate of the areas of each of the partitions A to D are managed. The HDD-management area 106a is provided in the SSD 107 or HDD 106. Here, partition A is such that the size of the area is large, and the usage rate is high. Partition B is such that the size of the area is large and the usage rate is low. Partition C is such that the size of the area is small and the usage rate is medium. Partition D is such that the size of the area is medium and the usage rate is medium.

The system-control unit 121 determines whether the size of each partition A to D is large, medium or small. In order to determine whether the size of each partition A to D is large, medium or small, the occupancy rate with respect to the overall size of the area of the HDD 106 is used, for example. When the number of partitions A to D is four, 25% (first threshold value) and 15% (second threshold value) with respect to the overall size of the area of the HDD 106 are set as threshold values. The threshold values of 25% and 15% are only examples, and the threshold values may be set arbitrarily.

The system-control unit 121 determines that the size of the area of partitions A to D that have an occupancy rate that is 25% (first threshold value) or greater with respect to the size of the overall area of the HDD 106 to be large. Moreover, the system-control unit 121 determines that the size of the area of partitions A to D that have an occupancy rate that is less than 25% (first threshold value) and equal to 15% (second threshold value) or greater with respect to the size of the overall area of the HDD 106 to be medium. Furthermore, the system-control unit 121 determines that the size of the area of partitions A to D that have an occupancy rate that is less than 15% (second threshold value) with respect to the size of the overall area of the HDD 106 to be small. As a result, each partition A to D is classified as being large, medium or small based on the size of the area of each partition A to D.

Moreover, the system-control unit 121 determines whether the usage rate of each partition A to D is high, medium or low. In order to determine whether the usage rate of each partition A to D is high, medium or low, the usage rate (percentage of the amount of data written) with respect to the size of the area of each respective partition A to D is used. In this case, for example, threshold values such as 70% (first threshold value) and 30% (second threshold value), for example, are set as the usage rate of each respective partition A to D. The threshold values of 70% and 30% are only examples, and can be set arbitrarily.

The system-control unit 121 determines that the usage rate of a partition A to D of which the amount of data written with respect to the size of the area of the respective partition A to D is 70% (first threshold value) or greater is high. Moreover, the system-control unit 121 determines that the usage rate of a partition A to D of which the amount of data written with respect to the size of the area of the respective partition A to D is less than 70% (first threshold value) and equal to or greater than 30% (second threshold value) is medium. Furthermore, the system-control unit 121 determines that the usage rate of a partition A to D of which the amount of data written with respect to the size of the area of the respective partition A to D is less than 30% (first threshold value) is low. The usage rate of each partition A to D increases each time the HDD 106 is used, so the system-control unit 121 periodically checks the usage rage of each partition A to D, and updates the usage rate of each partition A to D of the HDD management area 106*a*. As a result, each partition A to D is classified as being high, medium or low based on the usage rate with respect to the size of the area of each partition A to D.

Next, an overview of the disconnecting process for the HDD 106 when trouble occurs in the HDD 106 will be explained with reference to FIG. 3A and FIG. 3B.

Figure 3A:
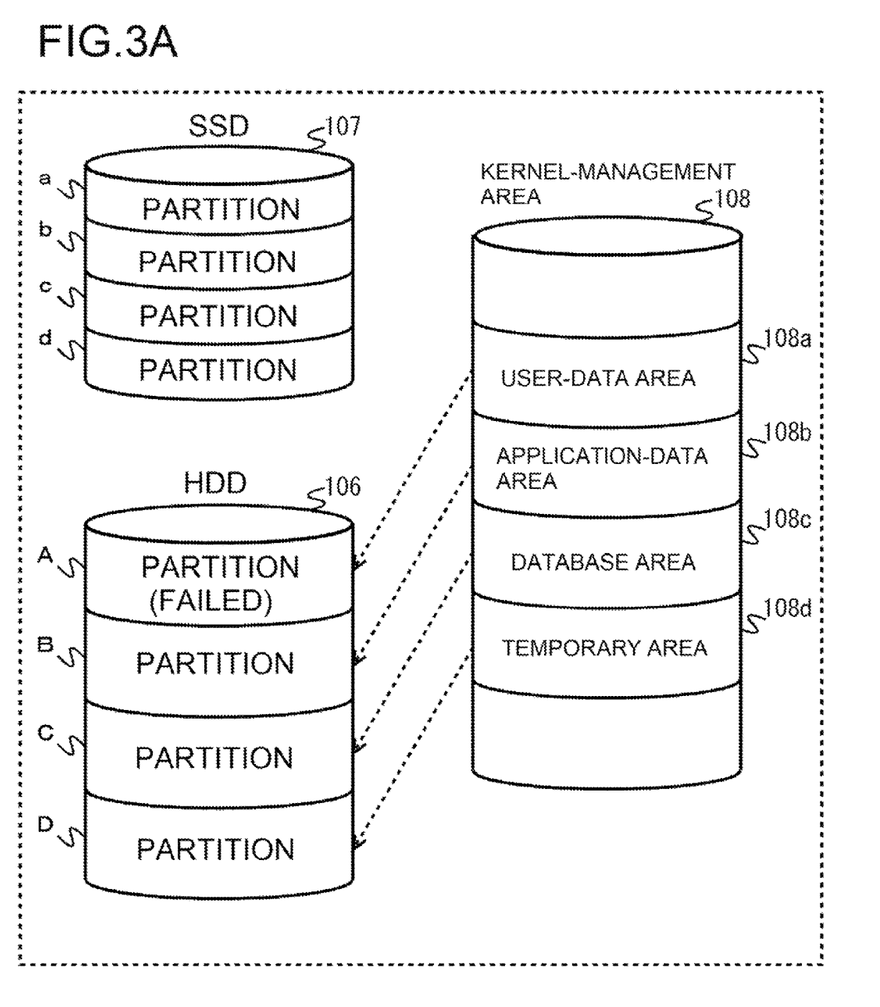
FIG. 3A explains an overview of the HDD disconnecting process when failure occurs in the HDD in FIG. 1, and illustrates the partitions of the SDD, the partitions of the HDD, and a kernel management area that manages the respective partitions.

First, the SSD 107 illustrated in FIG. 3A, as described above, stores system data for performing overall control of the MFP 100. Moreover, as described above, the SSD 107 has partitions a to d. The HDD 106 illustrated in FIG. 3A also, as described above, has partitions A to D. Moreover, the kernel management area 108 illustrated in FIG. 3A, as described above, is managed by the system-control unit 121, and illustrates an area for managing the partitions A to D of the HDD 106.

Here, when it becomes impossible to read from or write to the HDD 106, the system-control unit 121 executes a re-mounting process for each of the partitions A to D, and determines there is a problem in a partition A to D for which mounting failed. When the system-control unit 121 determines, for example, that there is failure in partition A, the system-control unit 121 references the HDD management area 106*a* in FIG. 2B and checks the partitions B to D that can be used as a replacement. When checking whether or not a partition can be used as a replacement, the system-control unit 121, as will be described in detail later, takes into consideration the size and usage rate of the area of partition A that failed.

Figure 3B:
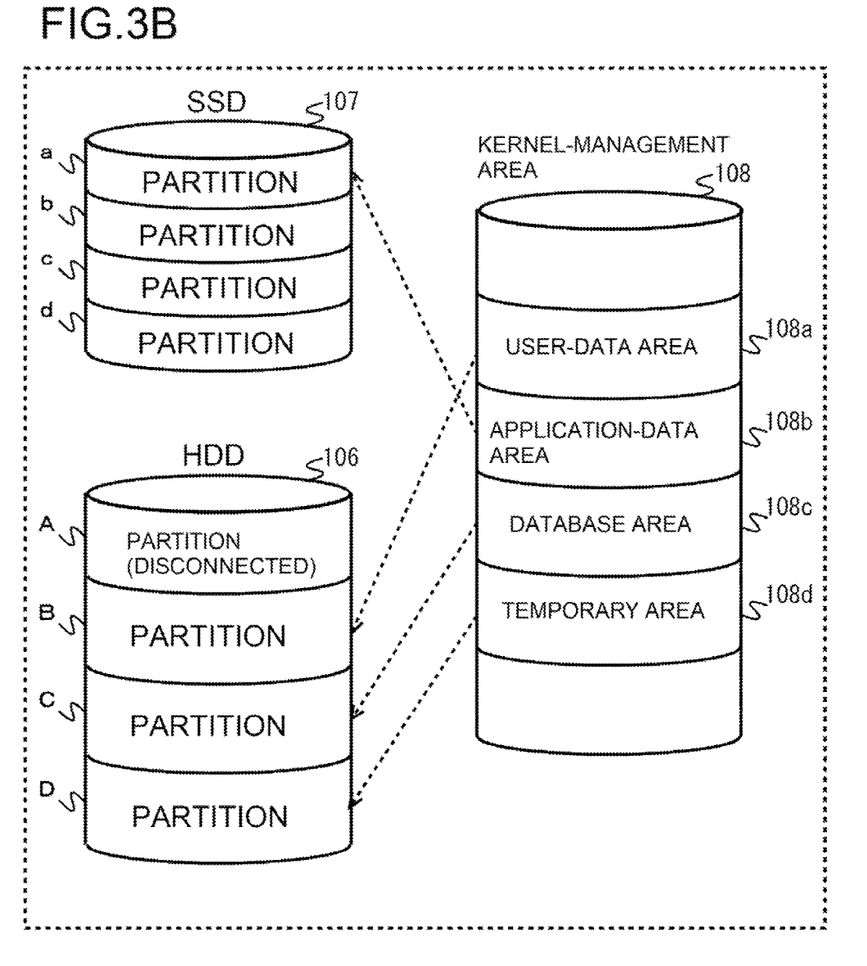
FIG. 3B explains an overview of the HDD disconnecting process when failure occurs in the HDD in FIG. 1, and illustrates the case of replacing a failed partition of the HDD with another partition inside the HDD.

When taking into consideration the size of the area and the system-control unit 121 confirms that the size of the partition B is the same as that of partition A, the system-control unit 121, as illustrated in FIG. 3B, moves the data of partition B of the HDD 106 to partition a of the SSD 107, and disconnects partition A. Moreover, the system-control unit 121 regards partition B of the HDD 106 as the user-data area 108*a*, and manages partition a of the SSD 107 as the application-data area 108*b*.

Figure 4:
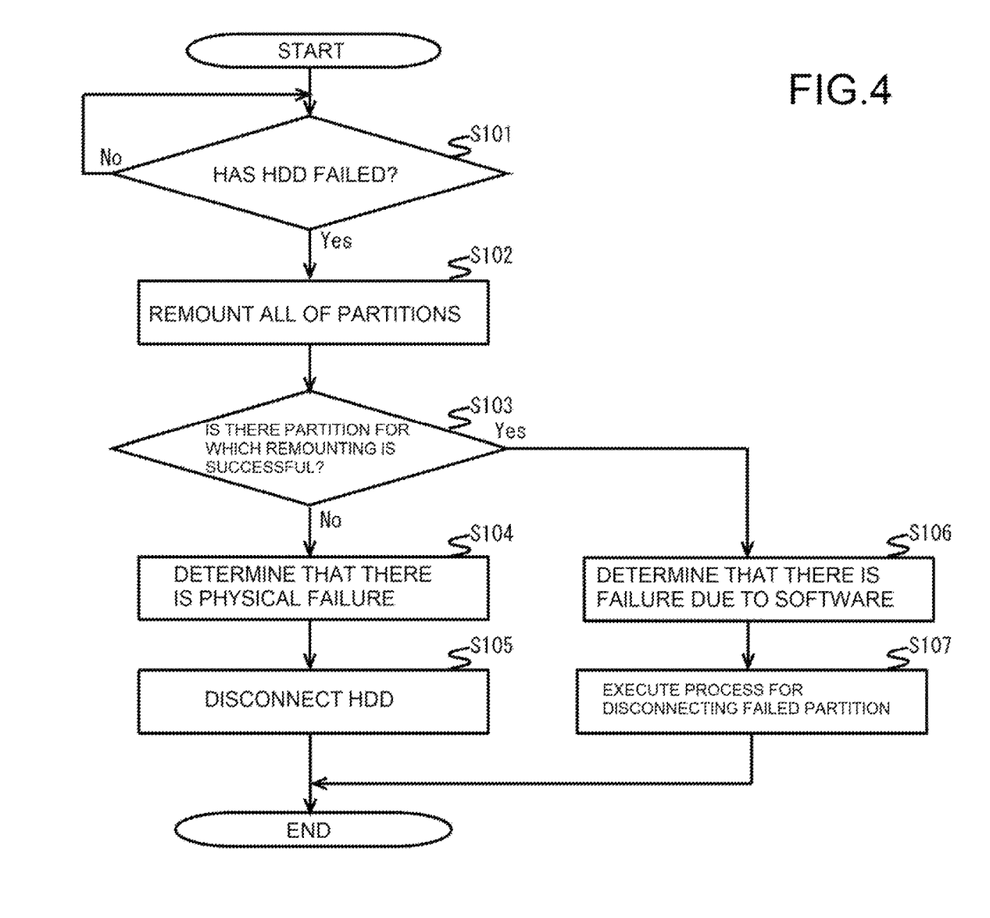
FIG. 4 illustrates steps of detecting failure types of the HDD illustrated in FIG. 1.

Next, detection of types of failure of the HDD 106 will be explained with reference to FIG. 4.
(Step S101)
The system-control unit 121 determines whether or not there is HDD 106 failure.

In this case, the system-control unit 121 determines there is no failure in the HDD 106 when there is no notification from the HDD-control unit 119 indicating that it is not possible to read data from or write data to the HDD 106 (step S101: NO).

However, the system-control unit 121 determines that there is failure in the HDD 106 when there is a notification from the HDD-control unit 119 indicating that it is not possible to read data from or write data to the HDD 106 (step S101: YES), and processing moves to step S102.
(Step S102)
The system-control unit 121 re-mounts all of the partitions A to D of the HDD 106.
(Step S103)
The system-control unit 121 determines whether or not there are any partitions A to D for which re-mounting is successful.

Here, when the system-control unit 121 determines that there are no partitions A to D for which re-mounting is successful (step S103: NO), processing moves to step S104.

However, when the system-control unit 121 determines that there are partitions A to D for which re-mounting is successful (step S103: YES), processing moves to step S106.
(Step S104)
The system-control unit 121 determines there is physical failure.

In this case, the system-control unit 121 instructs the panel-operation-control unit 118 to display contents indicating a physical failure on the panel unit 105.
(Step S105)
The system-control unit 121 disconnects the HDD 106.
(Step S106)
The system-control unit 121 determines that failure is due to software.

In this case, the system-control unit 121 instructs the panel-operation-control unit 118 to display contents indicating failure due to software on the panel unit 105.
(Step S107)
The system-control unit 121 executes processing to disconnect the failed partition A to D.

The process in step S107 for disconnecting the failed partition A to D will be explained later with reference to FIG. 5 and FIG. 6.

Next, a first process for disconnecting a failed partition A to D will be explained with reference to FIG. 5. In the following, a case in which partition A of the HDD 106 illustrated in FIG. 2A and FIG. 2B failed (is not possible to read from or write to partition A) will be explained.
(Step S201)
The system-control unit 121 determines whether or not there is a partition among partitions B to D having a size that is closest to the size of the area of partition A.

In this case, the system-control unit 121 confirms from the HDD-management area 106*a* in FIG. 2B that the size of the area of the failed partition A is large, and determines whether or not there is a partition among the partitions B to D having an area that is large. An area having a large size, as described above, means the occupancy rate of the partition B to D is 25% (first threshold value) or greater with respect to the size of the overall area of the HDD 106. In the example illustrated in FIG. 5, a partition having a size of an area that is large the same as the failed partition A is determined as a partition that has a size that is closest to the size of the area of partition A.

Then, the system-control unit 121 as illustrated in FIG. 2B, by confirming from the HDD-management area 106a that partition B has an area size that is large, determines that there is partition B having an area size that is large (step S201: YES), and processing moves to step S202.

However, the system-control unit 121 is not able to confirm from the HDD-management area 106a a partition B to D having an area size that is large. In this case, the system-control unit 121 determines that there are no partitions among the partitions B to D having an area size that is large (presumes that the area size of partition B illustrated in FIG. 2B is not large) (step S201: NO), and processing moves to step S206.

(Step S202)

The system-control unit 121 determines whether or not there are two or more partitions from among the partitions B to D having an area size that is large.

In this case, when the system-control unit 121 determines that there are two or more partitions having an area size that is large (presumes that the size of the area of partition D in FIG. 2B is large and not medium) (step S202: YES), processing moves to step S203.

However, as illustrated in FIG. 2B, when the system-control unit 121 determines that there are not two or more partitions having an area size that is large (step S202: NO), processing moves to step S207.

(Step S203)

The system-control unit 121 determines whether or not there is a partition among the partitions B and D that have a large area size that has a usage rate that is low.

In this case, the system-control unit 121, by confirming from the HDD-management area 106a that the usage rate of partition B is low, determines that there is partition B having a usage rate that is low (step S203: YES), and processing moves to step S204.

However, when the system-control unit 121 confirms from the HDD-management area 106a that there are no partitions among the partitions B and D that have an area size that is large that has a usage rate that is low (presumes that the usage rate with respect to the size of the area of partition B in FIG. 2B is medium and not low), the system-control unit 121 determines that there are no partitions B and D having a low usage rate (step S203: NO), and processing moves to step S208.

A low usage rate means, as described above, that the amount of data written with respect to the size of the areas of the respective partitions A to D is less than 30% (second threshold value) for example.

(Step S204)

The system-control unit 121 moves the data of the partition B that is determined in step S204 to have a low usage rate to the partition a of the SSD 107.

In this case, the system-control unit 121 moves the data of partition B that is confirmed from the HDD-management area 106a to have a low usage rate to the partition a of the SSD 107.

The destination to which the data of partition B is moved is not limited to partition a of the SSD 107, and may be any one of the other partitions b to d.

Moreover, when there are two or more partitions that are determined in step S204 to have a low usage rate, the system-control unit 121 moves the data of the partition having the lowest value of usage rate of the partitions having a low usage rate to partition a of the SSD 107.

(Step S205)

The system-control unit 121 mounts the partition to which the data is moved as a user-data area.

In this case, the system-control unit 121 moves the data of the partition of the HDD 106 that is the movement source for moving the data, to the partition a of the SSD 107, and then disconnects partition A. Moreover, the system-control unit 121 regards the user-data area of the kernel-management area 108 as partition B of the HDD 106, and manages the application-data area of the kernel-management area 108 as partition a of the SSD 107.

(Step S206)

The system-control unit 121 determines whether or not there are two or more partitions from among the partitions B to D that have the largest area size.

In this case, the system-control unit 121 confirms from the HDD-management area 106a that there are two or more partitions among the partitions B to D that have an area size that is medium (presumes that the area size of the partition B illustrated in FIG. 2B is medium and not large). Then, the system-control unit 121 determines that there are two or more partitions having an area size that is medium (step S206: YES), and processing moves to step S208.

However, the system-control unit 121 determines that there are not two or more partitions among the partitions B to D that have an area size that is medium (presumes that the size of the area of partition B illustrated in FIG. 2B is not large but small) (step S206: NO). Then, processing moves to step S209.

An area size that is medium, as described above, means, for example, that the occupancy rate of the partitions B to D with respect to the size of the overall area of the HDD 106 is less than 25% (first threshold value) and equal to or greater than 15% (second threshold value).

(Step S207)

The system-control unit 121 moves the data of partition B having an area size that is large to partition a of the SSD 107, and then processing moves to step S205.

In this case, when the system-control unit 121 confirms from the HDD-management area 106a that the area size of partition B is large, the system-control unit 121 moves the data of partition B to partition a of the SSD 107.

(Step S208)

The system-control unit 121 moves the data of the partition B to D from among partitions B and D that are determined in step S206 to have the largest area size (the area size is medium) that has the lowest usage rate to partition a of the SSD 107, and processing moves to step S205.

In this case, when the system-control unit 121 confirms from the HDD-management area 106a that the usage rate of partition B is low, and that the usage rate of partition D is medium, the system-control unit 121 moves the data of partition B to partition a of the SSD 107.

In step S208, when there are two or more partitions having a usage rate that is low, the system-control unit 121 moves the data of the partition having the lowest value of usage rate of the plural partitions having a usage rate that is low to partition a of the SSD 107.

(Step S209)

The system-control unit 121 moves the data of the partition D that is determined in step S206 to have the largest area size (the area size is medium) to partition a of the SSD 107, then processing moves to step S205.

In this case, when the system-control unit 121 confirms from the HDD-management area 106a that the size of the area of partition D is medium, the system-control unit 121 moves the data of partition B to the partition a of the SSD 107.

Next, the second process for disconnecting the failed partition A to D will be explained with reference to FIG. 6. In the following, as described above, the case in which partition A of the HDD 106 illustrated in FIG. 2A and FIG. 2B failed (reading from or writing to partition A is not possible) will be explained.
(Step S301)

The system-control unit 121 determines whether or not there is a partition B to D having a usage rate that is the closest usage rate with respect to the size of the area of partition A.

In this case, the system-control unit 121 references the HDD-management area 106a in FIG. 2B and determines whether or not there is a partition among the partitions B to D having a usage rate that is low. A low usage rate, as described above, means, for example, that the amount of written data with respect to the size of the area of the respective partitions A to D is less than 30% (second threshold value).

Then, as illustrated in FIG. 2B, the system-control unit 121, by confirming from the HDD-management area 106a that partition B has a usage rate that is low, determines that there is partition B that has a low usage rate (step S301: YES), and processing moves to step S302.

However, when the system-control unit 121 is not able to confirm from the HDD-management area 106a a partition B to D that has a low usage rate (presumes that the usage rate with respect to the size of the area of partition B illustrated in FIG. 2B is not low but medium), the system-control unit 121 determines that there is no partition B to D having a low usage rate (step S301: NO), and processing moves to step S306.
(Step S302)

The system-control unit 121 determines whether or not there are two or more partitions among partitions B to D having a low usage rate.

In this case, the system-control unit 121 determines that there are two or more partitions B to D among the partitions B to D having a low usage rate (presumes the usage rate with respect to the size of the area of partition D illustrated in FIG. 2B is not medium, but low) (step S302; YES). Processing then moves to step S303.

However, when the system-control unit 121 determines that there are not two or more partition that have a low usage rate (the usage rate with respect to the size of the area of partition B illustrated in FIG. 2B is not low but medium) (step S302: NO), processing moves to step S307.
(Step S303)

The system-control unit 121 determines whether or not there is a large partition among the partitions B and D determined in step S302 to have a low usage rate that has a size that is closest to the size of the area of partition A.

In this case, the system-control unit 121 confirms from the HDD-management area 106a that size of the area of failed partition A is large, and determines whether or not there is a partition among the partitions B and D that has an area size that is large. An area size that is large, as described above, means, for example, that the occupancy rate of the partition B to D with respect to the size of the overall area of the HDD 106 is 25% (first threshold value) or greater. In the example illustrated in FIG. 6, a partition having a large area size that is the same as that of the failed partition A is determined as a partition having a size that is closest to the size of the area of partition A.

Then, the system-control unit 121, by confirming that the size of the area of partition B is large, determines there is partition B that has an area size that is large (step S303: YES), and processing moves to step S304.

Moreover, when there are two or more partitions that are determined in step S303 to have an area size that is large, the system-control unit 121 moves the data of the partition among the partitions having an area size that is large that has the largest value of the area size to partition a of the SSD 107.

However, the system-control unit 121 confirms from the HDD-management area 106a that there is no partition B to D that has an area size that is large (presumes that the size of the area of partition B illustrated in FIG. 2B is not large). Then, the system-control unit 121 determines that there is no partition B to D having an area size that is large (step S303: NO), and processing moves to step S308.

An area size that is large, as described above, means, for example, that the occupancy rate of a partition B to D with respect to the size of the overall area of the HDD 106 is 25% (first threshold value) or greater.
(Step S304)

The system-control unit 121 moves the data of partition B having an area size that is large to partition a of the SSD 107.

In this case, the system-control unit 121 moves the data of partition B that is confirmed from the HDD-management-area 106a to have an area size that is large to partition a of the SSD 107.

The destination for moving the data of partition B is not limited to partition a of the SSD 107, and may be any one of the other partitions b to d.
(Step S305)

The system-control unit 121 mounts the partition to which the data is moved as the user data area.

In this case, the system-control unit 121 moves the data of partition B of the HDD 106 that is the movement source for moving data to partition a of the SSD 107, and then disconnects the partition A. Moreover, the system-control unit 121 manages the user-data area of the kernel-management area 108 as the partition B of the HDD 106, and manages the application-data area of the kernel-management area 108 as partition a of the SSD 107.
(Step S306)

The system-control unit 121 determines whether or not there are two or more partitions B to D among the partitions B to D that have the lowest usage rate.

In this case, the system-control unit 121 confirms from the HDD-management area 106a that there are two or more partitions among the partitions B to D having a medium usage rate (presumes that the usage rate with respect to the size of the area of partition B illustrated in FIG. 2B is medium). Then, the system-control unit 121 determines that there are two or more partitions B to D having a usage rate that is medium (step S306; YES), and processing moves to step S308.

However, when the system-control unit 121 determines that there are not two or more partitions B to D having a medium usage rate (presumes that the usage rate with respect to the size of the area of partitions B and C illustrated in FIG. 2B is larger) (step S306: NO), processing moves to step S309.

A medium usage rate, as described above, is when the amount of written data with respect to the size of the area of the respective partitions A to D is less than 70% (first threshold value) and 30% or greater (second threshold value).

(Step S307)

The system-control unit 121 moves the data of partition B having a low usage rate to partition a of the SSD 107, then processing moves to step S305.

In this case, when the system-control unit 121 confirms from the HDD-management area 106a that the usage rate of partition B is low, the system-control unit 121 moves the data of partition B to the partition a of the SSD 107.

(Step S308)

The system-control unit 121 moves data of a partition of the partitions B to D that is determined in step S306 to have a medium usage rate that has the largest area size to partition a of the SSD 107, then processing moves to step S305.

In this case, when the system-control unit 121 confirms from the HDD-management area 106a that the size of the area of partition B is large, the system-control unit 121 moves the data from partition B to partition a of the SSD 107, then processing moves to step S305.

(Step S309)

The system-control unit 121 moves the data of the partition D determined in step S306 to have the lowest usage rate to partition a of the SSD 107.

In this case, when the system-control unit 121 determines from the HDD-management area 106a that the usage rate of partition D is medium, the system-control unit 121 moves the data of partition B to partition a of the SSD 107.

In this way, in this embodiment, the system-control unit 121 though a mounting process manages each of the partitions A to D of the HDD 106 and the SSD 107 (storage device) that has a storage capacity that is less than the HDD 106. When it becomes impossible to read from or write to any one of the partitions A to D, the system-control unit 121 moves the data of the other partitions A to D to the SSD 107 (storage device), and disconnects the disabled partition A to D. Together with this, the system-control unit 121 replaces the disconnected partition with the partition A to D to which data was moved. As a result, operation can be continued without increasing the number of HDDs 106, so it is possible to suppress an increase in cost that accompanies an increase in the size of the MFP 100 and an increase in the number of parts.

In this embodiment, the electronic apparatus according to the present disclosure was explained as being a MFP 100, however, of course, the technology according to the present disclosure may also be applied to other electronic apparatuses such as a PC (Personal Computer) or server in which it is possible to mount a storage devices such as a HDD 106, SSD 107 that is a non-volatile memory and the like.

Moreover, in the present embodiment, the case was explained in which a partition A of a HDD 106 that is managed as a user-data area 108a fails However, the technology according to the present disclosure may also be applied to the case in which a partition that is managed as an application data area 108b, as a database area 108c, or as a temporary area 108d fails.

Moreover, in this embodiment, the size of the area of a partition and the usage rate with respect to the size of the area of a partition are both classified in 3 stages, however, the size and usage rate may be classified in two stages or four stages or more.

Figure 5:
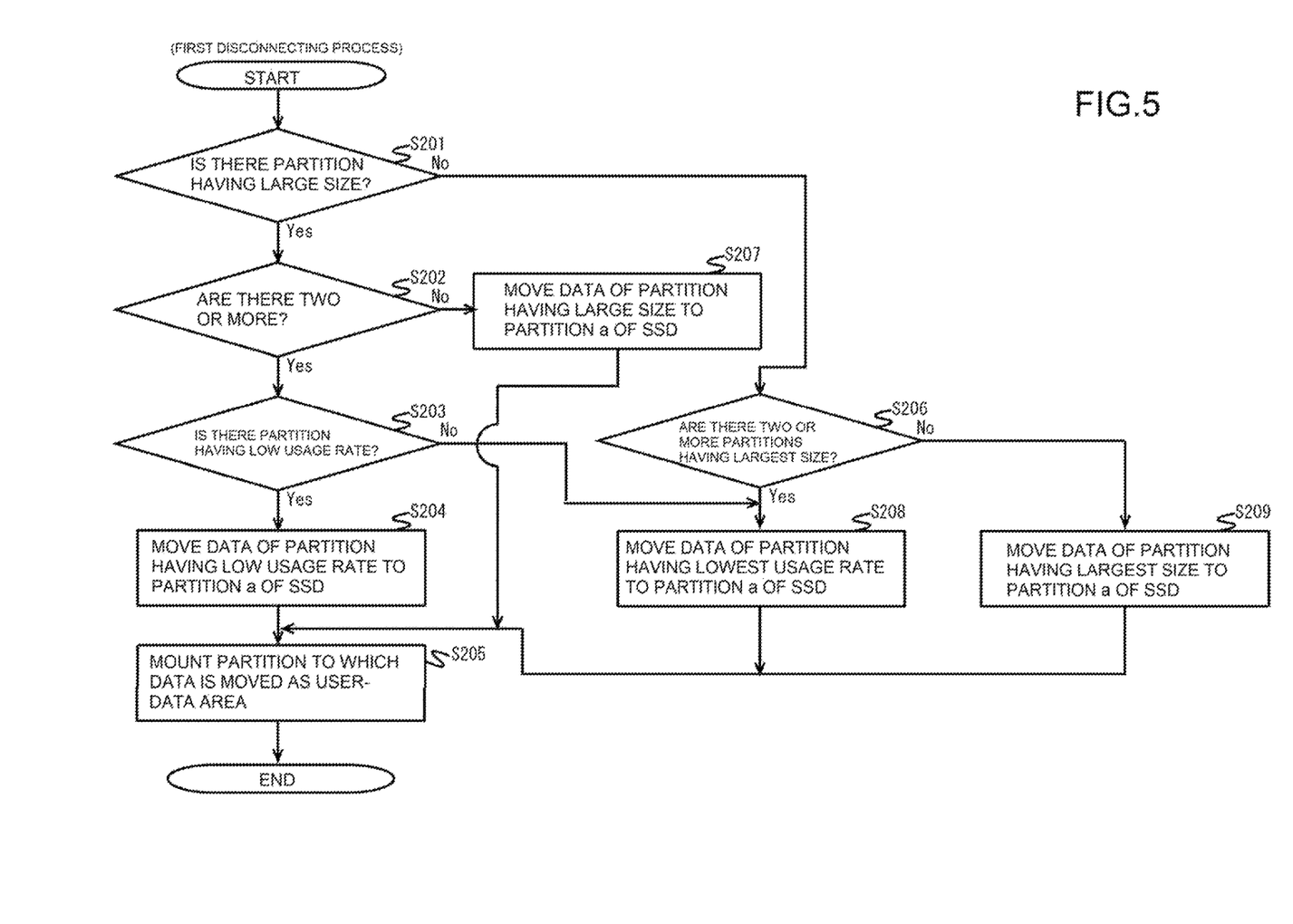
FIG. 5 illustrates steps of a first disconnecting process for partitions based on the detection of the failure types in FIG. 4.

Moreover, in the steps S204, S207, S208 and S209 illustrated in FIG. 5, the case is explained in which the usage rate with respect to the size of the area of a partition of the HDD 106 that is the movement source from which data is moved to the SSD 107 is classified as being equal to or greater than the usage rate with respect to the size of the area of a failed partition, or equal to or greater than the usage rate.

In this case, the system-control unit 121 data does not need to be moved to the SSD 107 in step S204, S207, S208 or S209. In addition, in S205, the user-data area of the kernel-management area 108 may be managed as partition a of the SSD 107.

Figure 6:
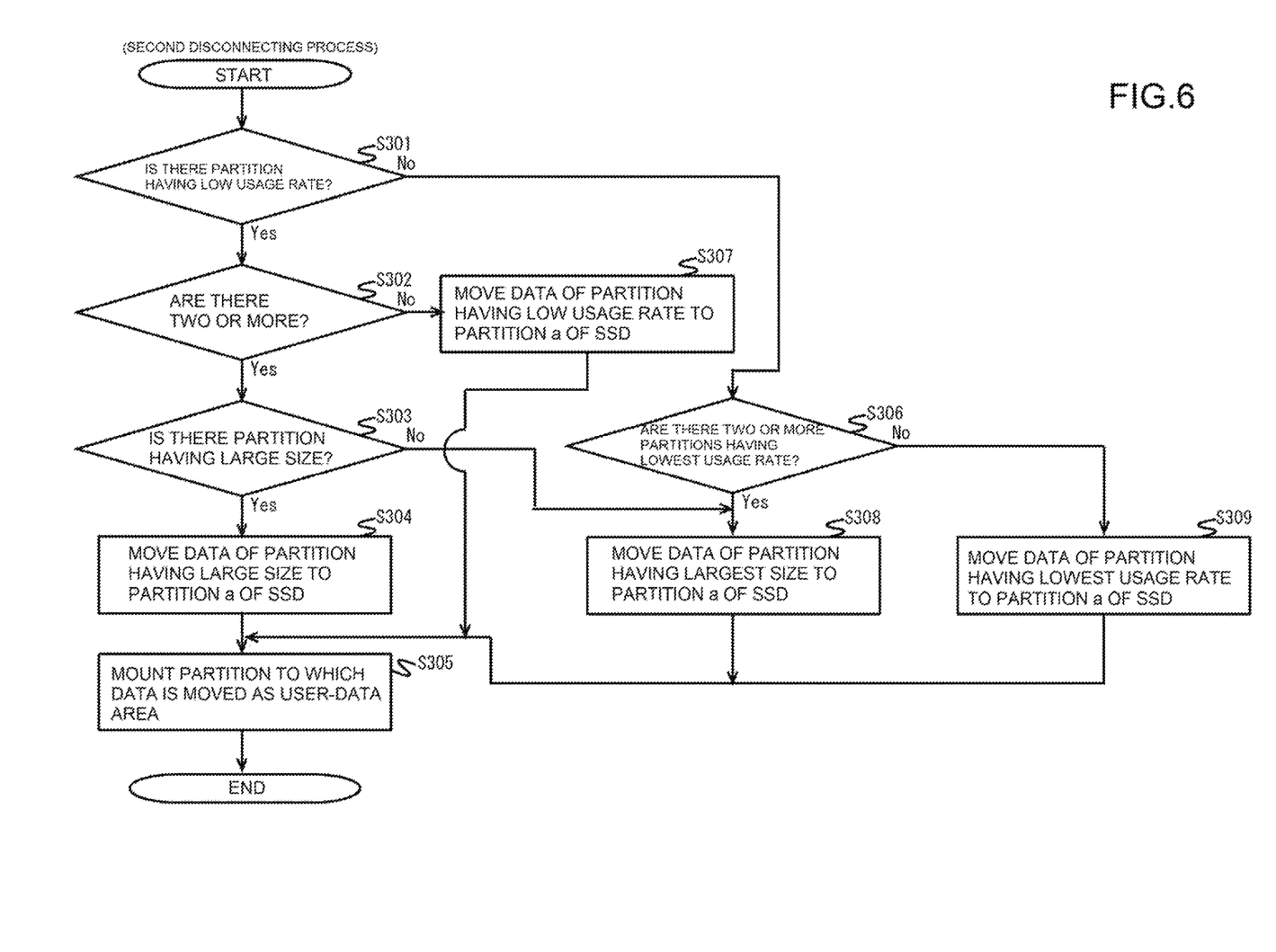
FIG. 6 illustrates steps of a second disconnecting process for partitions based on the detection of the failure types in FIG. 4.

Moreover, the case is explained in which in step S304, S307, S308 and S309 illustrated in FIG. 6, the usage rate with respect to the size of the area of the partition of the HDD 106 that is the movement source for moving data to the SSD 107 is classified as being equal to or greater than the usage rate with respect to the size of the area of the failed partition, or equal to or greater than the usage rate. In this case, the system-control unit 121 does not need to move data to the SSD 107 in step S304, S307, S308 or S309. In addition, in step S305, the user-data area of the kernel-management area 108 may be managed as partition a of the SSD 107.

In a typical hard disk apparatus, failure of the operation of an operating HDD can be predicted in advance, and the HDD is disconnected before operation becomes impossible and another HDD can be operated, so continuous operation is possible.

Incidentally, when the operating method of a typical HDD as described above is applied to an image forming apparatus as described above, it is necessary to mount plural HDDs in an image forming apparatus. However, when plural HDDs are mounted in an image forming apparatus, there is a problem in that cost increases as the image forming apparatus becomes larger and the number of parts increases due to maintaining installation space for the respective HDDs and maintaining space for wiring the wiring cables of the respective HDDs.

With the electronic apparatus, the non-transitory computer-readable recording medium and the HDD disconnecting method according to the present disclosure, it is possible to continue operation without increasing the number of HDDs, so it is possible to suppress an increase in cost due to an increase in the size and an increase in the number of parts of the electronic apparatus.

The technology according to the present disclosure is not limited to the embodiments described above, and needless to say various modifications are possible within a range that does not depart from the scope of the present disclosure.

What is claimed is:

1. An electronic apparatus, comprising:
an HDD that has first partitions managed as areas for respective types of data;
a storage device that has second partitions, the storage device having a smaller storage capacity than the HDD; and
a system-control unit that manages each of the first partitions of the HDD and the storage device by a mounting process; wherein
when it becomes impossible to read data from or write data to any one of the first partitions, the system-control unit, together with moving data of one of the other first partitions that is different from the first partition impossible to read or write to one of the second partitions of the storage device and disconnecting the first partition impossible to read or write, replaces the first partition impossible to read or write with the one of the other first partitions from which the data has been moved to the one of the second partitions, and
manages one of the second partitions to which the data has been moved from the one of the other first partitions as an area corresponding to the type of the data that was moved from the one of the other first partitions.

2. The electronic apparatus according to claim 1, wherein the system-control unit
manages the size of the area of each of the first partitions; and
replaces the partition impossible to read or write with one of the first partitions having a size that is closest to the size of the area of the first partition impossible to read or write.

3. The electronic apparatus according to claim 2, wherein the system-control unit
manages the usage rate of the areas of each of the first partitions; and
when there are plural partitions of the other first partitions having a size that is closest to the size of the area of the first partition impossible to read or write, replaces the first partition impossible to read or write with one of the plural partitions that has the lowest usage rate of the plural partition.

4. The electronic apparatus according to claim 1, wherein the system-control unit
manages the area of each of the first partitions; and
replaces the first partition impossible to read or write with one of the other first partitions that has the lowest usage rate.

5. The electronic apparatus according to claim 4, wherein the system-control unit
manages the size of the area of each of the first partitions; and
when there are plural partitions of the other first partitions having the lowest usage rate, replaces the first partition impossible to read or write with one of the plural partitions having a size that is closest to the size of the area of the first partition impossible to read or write.

6. A non-transitory computer-readable recording medium for storing an HDD disconnecting program that can be executed by a computer of an electronic apparatus, wherein
when the HDD disconnecting program is executed, the HDD disconnecting program causes the computer to:
manage each of a plurality of first partitions as areas for respective types of data and a plurality of second partitions by a mounting process, wherein the first partitions are partitions of an HDD and the second partitions are partitions of a storage device that has a smaller storage capacity than the HDD:
when it becomes impossible to read data from or write data to any one of the first partitions, together with causing the computer to move data of one of the other first partitions that is different from the first partition impossible to read or write to one of the second partitions of the storage device and disconnect the first partition impossible to read or write, replace the first partition impossible to read or write with the one of the other first partitions from which the data has been moved to the one of the second partitions, and
manage one of the second partitions to which the data has been moved from the one of the other first partitions as an area corresponding to the type of the data that was moved from the one of the other first partitions.

7. An HDD disconnecting method, that comprises:
managing each of a plurality of first partitions as areas for respective types of data and a plurality of second partitions by a mounting process, wherein the first partitions are partitions of an HDD and the second partitions are partitions of a storage device that has a smaller storage capacity than the HDD:
when it becomes impossible to read data from or write data to any one of the first partitions, together with moving data of one of the other first partitions that is different from the first partition impossible to read or write to one of the second partitions of the storage device and disconnecting the first partition impossible to read or write, replacing the first partition impossible to read or write with the one of the other first partitions from which the data has been moved to the one of the second partitions; and
managing the one of the second partitions to which the data has been moved from the one of the other first partitions as an area corresponding to the type of the data that was moved from the one of the other first partitions.

* * * * *